US010846476B2

(12) United States Patent
Chen

(10) Patent No.: US 10,846,476 B2
(45) Date of Patent: Nov. 24, 2020

(54) METHOD AND APPARATUS FOR DISPLAYING TEXTUAL INPUT OF TERMINAL DEVICE, AND TERMINAL DEVICE

(71) Applicant: Huawei Technologies Co., Ltd., Shenzhen (CN)

(72) Inventor: Yujie Chen, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 375 days.

(21) Appl. No.: 15/567,911

(22) PCT Filed: Apr. 20, 2015

(86) PCT No.: PCT/CN2015/076959
§ 371 (c)(1),
(2) Date: Oct. 19, 2017

(87) PCT Pub. No.: WO2016/168963
PCT Pub. Date: Oct. 27, 2016

(65) Prior Publication Data
US 2018/0137096 A1 May 17, 2018

(51) Int. Cl.
*G06F 3/023* (2006.01)
*G06F 3/0489* (2013.01)
(Continued)

(52) U.S. Cl.
CPC .......... *G06F 40/274* (2020.01); *G06F 3/0236* (2013.01); *G06F 3/0237* (2013.01);
(Continued)

(58) Field of Classification Search
CPC .................................................. G06F 17/276
See application file for complete search history.

(56) References Cited

U.S. PATENT DOCUMENTS 8,464,180 B1 6/2013 Kirkham et al.
2009/0024383 A1 1/2009 Shiratori
(Continued)

FOREIGN PATENT DOCUMENTS

CN 1149148 A 5/1997
CN 101122840 A 2/2008
(Continued)

OTHER PUBLICATIONS

Jason et al.; "An Adaptive User Interface Model for Contact Centres"; Proceedings of the 11th Annual South Africa Telecommunications Networks and Applications Conference; Wild Coast Sun, South Africa; Sep. 6-10, 2008; 6 pages.
(Continued)

*Primary Examiner* — Amy Ng
*Assistant Examiner* — David Tan
(74) *Attorney, Agent, or Firm* — Fish & Richardson P.C.

(57) ABSTRACT

The present invention provides a method and an apparatus for displaying textual input of a terminal device, and a terminal device, so as to resolve prior-art problems that in a one-hand mode, a display area is reduced, operation difficulty is increased, a display manner is undiversified and inflexible, and user experience is reduced. The method is: the terminal device calculates a selection frequency at which each candidate area is selected in specified duration, uses, as an average delay value, an average value of delay values obtained when each candidate area is selected, and after the specified duration, adjusts, according to the obtained selection frequency and the obtained average delay value of each candidate area, a correspondence between each candidate area in each candidate area and a candidate-word display priority. In this way, according to an operation habit of a user for selecting each candidate area when using the terminal device, a candidate word displayed in the candidate area can
(Continued)

be dynamically adjusted, so that an entering speed is optimized, a display area does not need to be reduced, a display manner is flexible, and user experience is improved.

18 Claims, 4 Drawing Sheets

(51) Int. Cl.
*G06F 3/0484* (2013.01)
*G06F 3/0488* (2013.01)
*G06F 40/274* (2020.01)

(52) U.S. Cl.
CPC ...... *G06F 3/04842* (2013.01); *G06F 3/04883* (2013.01); *G06F 3/04886* (2013.01); *G06F 3/04895* (2013.01)

(56) References Cited

U.S. PATENT DOCUMENTS

| | | | |
|---|---|---|---|
| 2013/0021287 A1 | 1/2013 | Endo et al. | |
| 2013/0241838 A1 | 9/2013 | Onishi et al. | |
| 2014/0108992 A1* | 4/2014 | Bi | G06F 17/276 |
| | | | 715/773 |
| 2015/0007069 A1* | 1/2015 | Huang | G06F 3/04817 |
| | | | 715/763 |
| 2015/0067492 A1 | 3/2015 | Ozaki et al. | |
| 2015/0317300 A1 | 11/2015 | Huang et al. | |

FOREIGN PATENT DOCUMENTS

| | | |
|---|---|---|
| CN | 101424977 A | 5/2009 |
| CN | 102662603 A | 9/2012 |
| CN | 103226393 A | 7/2013 |
| CN | 104035667 A | 9/2014 |
| CN | 104391644 A | 3/2015 |
| JP | 3351213 B2 | 7/1997 |
| JP | 2011118729 A | 6/2011 |
| JP | 2011209824 A | 10/2011 |
| JP | 2012003545 A | 1/2012 |
| JP | 2013238936 A | 11/2013 |
| JP | 2014191355 A | 10/2014 |
| JP | 2015-045973 | 3/2015 |

OTHER PUBLICATIONS

Office Action issued in Chinese Application No. 201580078385.6 dated May 7, 2019, 7 pages (partial English translation).

* cited by examiner

METHOD AND APPARATUS FOR DISPLAYING TEXTUAL INPUT OF TERMINAL DEVICE, AND TERMINAL DEVICE

CROSS REFERENCE TO RELATED APPLICATIONS

This application is a National Stage of International Application No. PCT/CN2015/076959, filed Apr. 20, 2015, which is hereby incorporated by reference in its entirety.

TECHNICAL FIELD

The present invention relates to the field of text display technologies of a terminal device, and in particular, to a method and an apparatus for displaying textual input of a terminal device, and a terminal device.

BACKGROUND

With development of the science and technology, a large screen and an ultra-large screen are a development trend of intelligent terminal devices, so that not only richer content is shown, but a user operation becomes more convenient, For example, a smart phone, a tablet computer, and another intelligent terminal device have a large screen and a ultra-large screen. However, for some large-screen handheld intelligent terminal devices (such as a smart phone), a user usually performs an operation with one hand, and generally performs the operation with a thumb of a hand that holds the smart phone, or holds the smart phone with one hand and performs the operation with a finger of the other hand.

When content is entered by using a keyboard area on the large-screen intelligent terminal device, the large-screen intelligent terminal device may display multiple options in multiple candidate areas for the user to select. The multiple options are generally displayed in the multiple candidate areas by using a preferred-word high-frequency sorting method, that is, options with different selection frequencies are displayed in an order from left to right and from top to bottom of the candidate areas. An option with a highest selection frequency is displayed in an upper leftmost candidate area, and an option with a lowest selection frequency is displayed in a lower rightmost candidate area. For example, when an input method is enabled by using the large-screen intelligent terminal device to enter a character, the user enters a string of characters in the keyboard area, and multiple word options corresponding to the characters may be displayed in the multiple candidate areas. However, the thumb may not perform an operation on a candidate area on a screen edge, for example, when the right hand performs an operation and selects a word by using the input method, it may be inconvenient for a right thumb to select a word option in a leftmost candidate area on the screen. In the prior art, an operation may be performed on the large-screen intelligent terminal device in a one-hand mode, that is, a display area on the large screen is reduced in a specified proportion and is left aligned or right aligned.

However, in the foregoing method, a display area is reduced, operation difficulty is increased, a display manner is undiversified and inflexible, and user experience is reduced.

SUMMARY

Embodiments of the present invention provide a method and an apparatus for displaying textual input of a terminal device, and a terminal device, so as to resolve prior-art problems that in a one-hand mode, a display area is reduced, operation difficulty is increased, a display manner is undiversified and inflexible, and user experience is reduced.

A first aspect provides a method for displaying textual input of a terminal device, a screen of the terminal device includes a keyboard area and at least two candidate areas, each candidate area in the at least two candidate areas is corresponding to a different candidate-word display priority, each candidate area is used to display a candidate word that is of a corresponding candidate-word display priority and that is in a candidate-word subset of a character entered in the keyboard area, and the method includes:

counting, by the terminal device, a selection frequency at which each candidate area in the at least two candidate areas is selected in specified duration;

calculating, by the terminal device, a delay value from a moment at which entering is completed in the keyboard area to a moment at which each candidate area in the at least two candidate areas is selected each time in the specified duration;

calculating, by the terminal device, an average delay value of each candidate area in the at least two candidate areas in the specified duration according to the delay value;

after the specified duration, adjusting, according to the obtained selection frequency and the obtained average delay value of each candidate area in the at least two candidate areas, a correspondence between each candidate area in the at least two candidate areas and a candidate-word display priority; and displaying, in each candidate area in the at least two candidate areas according to the adjusted correspondence between each candidate area in the at least two candidate areas and a candidate-word display priority, the candidate word that is of the corresponding candidate-word display priority and that is in the candidate-word subset.

With reference to a first aspect, in a first possible implementation manner, before the adjusting a correspondence between each candidate area in the at least two candidate areas and a candidate-word display priority, the method further includes:

determining that an obtained selection frequency of at least one candidate area is greater than or equal to a specified frequency threshold; or receiving an adjustment instruction.

With reference to the first aspect or the first possible implementation manner of the first aspect, the adjusting, according to the obtained selection frequency and the obtained average delay value of each candidate area in the at least two candidate areas, a correspondence between each candidate area in the at least two candidate areas and a candidate-word display priority includes:

sorting the at least two candidate areas in descending order of the obtained selection frequencies of the at least two candidate areas;

obtaining, according to the sorted at least two candidate areas, an order of candidate-word display priorities corresponding to the at least two candidate areas, and using the order as a candidate-word display priority sequence;

sorting the at least two candidate areas in ascending order of the obtained average delay values of the at least two candidate areas, to obtain a candidate-area sequence; and setting an $N^{th}$ display priority in the candidate-word display priority sequence for an $N^{th}$ candidate area in the candidate-area sequence, where N is a positive integer less than or equal to a quantity of candidate areas.

With reference to any one of the first aspect or the foregoing possible implementation manners of the first aspect, in a third possible implementation manner, before the counting, by the terminal device, a selection frequency at which each candidate area in the at least two candidate areas is selected in specified duration, the method further includes:

determining, by the terminal device, a current operation mode;

determining, by the terminal device according to a preset correspondence between an operation mode and a display configuration manner, a display configuration manner corresponding to the current operation mode, where the display configuration manner includes the correspondence between each candidate area in the at least two candidate areas and a candidate-word display priority; and displaying, in each candidate area in the at least two candidate areas according to the correspondence, a candidate word that is of a candidate-word display priority corresponding to each candidate area and that is in the candidate-word subset.

With reference to the third possible implementation manner of the first aspect, in a fourth possible implementation manner, the determining, by the terminal device, a current operation mode includes:

determining, by the terminal device, the current operation mode according to current setting; or determining, by the terminal device, the current operation mode according to a triggered sliding operation and/or operation frequencies at which a left part and a right part of the terminal device are triggered.

With reference to the third or the fourth possible implementation manner of the first aspect, in a fifth possible implementation manner, the operation mode includes a left-hand operation mode or a right-hand operation mode.

With reference to any one of the third to the fifth possible implementation manners of the first aspect, in a sixth possible implementation manner, after the adjusting a correspondence between each candidate area in the at least two candidate areas and a candidate-word display priority, the method further includes:

using the adjusted correspondence between each candidate area in the at least two candidate areas and a candidate-word display priority as a new display configuration manner; and updating a display configuration manner in the preset correspondence between an operation mode and a display configuration manner to the new display configuration manner.

A second aspect provides in an apparatus for displaying textual input of a terminal device, a screen of the terminal device includes a keyboard area and at least two candidate areas, each candidate area in the at least two candidate areas is corresponding to a different candidate-word display priority, each candidate area is used to display a candidate word that is of a corresponding candidate-word display priority and that is in a candidate-word subset of a character entered in the keyboard area, and the apparatus includes:

a first processing unit, configured to count a selection frequency at which each candidate area in the at least two candidate areas is selected in specified duration;

a second processing unit, configured to calculate a delay value from a moment at which entering is completed in the keyboard area to a moment at which each candidate area in the at least two candidate areas is selected each time in the specified duration;

a calculation unit, configured to calculate an average delay value of each candidate area in the at least two candidate areas in the specified duration according to the delay value;

an adjustment unit, configured to: after the specified duration, adjust, according to the obtained selection frequency and the obtained average delay value of each candidate area in the at least two candidate areas, a correspondence between each candidate area in the at least two candidate areas and a candidate-word display priority; and a display unit, configured to display, in each candidate area in the at least two candidate areas according to the adjusted correspondence between each candidate area in the at least two candidate areas and a candidate-word display priority, the candidate word that is of the corresponding candidate-word display priority and that is in the candidate-word subset.

With reference to the second aspect, in a first possible implementation manner, the adjustment unit further configured to:

before adjusting the correspondence between each candidate area in the at least two candidate areas and a candidate-word display priority, determine that an obtained selection frequency of at least one candidate area is greater than or equal to a specified frequency threshold, or receive an adjustment instruction.

With reference to the second aspect or the first possible implementation manner of the second aspect, the adjustment unit is configured to:

sort the at least two candidate areas in descending order of the obtained selection frequencies of the at least two candidate areas;

obtain, according to the sorted at least two candidate areas, an order of candidate-word display priorities corresponding to the at least two candidate areas, and use the order as a candidate-word display priority sequence;

sort the at least two candidate areas in ascending order of the obtained average delay values of the at least two candidate areas, to obtain a candidate-area sequence; and set an $N^{th}$ display priority in the candidate-word display priority sequence for an $N^{th}$ candidate area in the candidate-area sequence, where N is a positive integer less than or equal to a quantity of candidate areas.

With reference to any one of the second aspect or the foregoing possible implementation manners of the second aspect, in a third possible implementation manner, the apparatus further includes:

a configuration unit, configured to: before the first processing unit counts the selection frequency at which each candidate area in the at least two candidate areas is selected in the specified duration, determine a current operation mode of the terminal device;

determine, according to a preset correspondence between an operation mode and a display configuration manner, a display configuration manner corresponding to the current operation mode, where the display configuration manner includes the correspondence between each candidate area in the at least two candidate areas and a candidate-word display priority; and display, in each candidate area in the at least two candidate areas according to the correspondence, a candidate word that is of a candidate-word display priority corresponding to each candidate area and that is in the candidate-word subset.

With reference to the third possible implementation manner of the second aspect, in a fourth possible implementation manner, when determining the current operation mode of the terminal device, the configuration unit is configured to:

determine the current operation mode according to current setting of the terminal device; or determine the current operation mode according to a triggered sliding operation of the terminal device and/or operation frequencies at which a left part and a right part of the terminal device are triggered.

With reference to the third or the fourth possible implementation manner of the second aspect, in a fifth possible implementation manner, the operation mode includes a left-hand operation mode or a right-hand operation mode.

With reference to any one of the third to the fifth possible implementation manners of the second aspect, in a sixth possible implementation manner, the adjustment unit is further configured to:

after adjusting the correspondence between each candidate area in the at least two candidate areas and a candidate-word display priority, use the adjusted correspondence between each candidate area in the at least two candidate areas and a candidate-word display priority as a new display configuration manner; and update a display configuration manner in the preset correspondence between an operation mode and a display configuration manner to the new display configuration manner.

A third aspect provides a terminal device, a screen of the terminal device includes a keyboard area and at least two candidate areas, each candidate area in the at least two candidate areas is corresponding to a different candidate-word display priority, each candidate area is used to display a candidate word that is of a corresponding candidate-word display priority and that is in a candidate-word subset of a character entered in the keyboard area, and the terminal device includes:

a processor, configured to count a selection frequency at which each candidate area in the at least two candidate areas is selected in specified duration;

calculate a delay value from a moment at which entering is completed in the keyboard area to a moment at which each candidate area in the at least two candidate areas is selected each time in the specified duration;

calculate an average delay value of each candidate area in the at least two candidate areas in the specified duration according to the delay value; and after the specified duration, adjust, according to the obtained selection frequency and the obtained average delay value of each candidate area in the at least two candidate areas, a correspondence between each candidate area in the at least two candidate areas and a candidate-word display priority; and a display, configured to display, in each candidate area in the at least two candidate areas on the screen according to the correspondence that is between each candidate area in the at least two candidate areas and a candidate-word display priority and that is adjusted by the processor, the candidate word that is of the corresponding candidate-word display priority and that is in the candidate-word subset.

With reference to the third aspect, in a first possible implementation manner, the processor is further configured to:

before adjusting the correspondence between each candidate area in the at least two candidate areas and a candidate-word display priority, determine that an obtained selection frequency of at least one candidate area is greater than or equal to a specified frequency threshold, or receive an adjustment instruction.

With reference to the third aspect or the first possible implementation manner of the third aspect, the processor is configured to:

sort the at least two candidate areas in descending order of the obtained selection frequencies of the at least two candidate areas;

obtain, according to the sorted at least two candidate areas, an order of candidate-word display priorities corresponding to the at least two candidate areas, and use the order as a candidate-word display priority sequence;

sort the at least two candidate areas in ascending order of the obtained average delay values of the at least two candidate areas, to obtain a candidate-area sequence; and set an $N^{th}$ display priority in the candidate-word display priority sequence for an $N^{th}$ candidate area in the candidate-area sequence, where N is a positive integer less than or equal to a quantity of candidate areas.

With reference to any one of the third aspect or the foregoing possible implementation manners of the third aspect, in a third possible implementation manner, the processor is further configured to:

before counting the selection frequency at which each candidate area in the at least two candidate areas is selected in the specified duration, determine a current operation mode of the terminal device;

determine, according to a preset correspondence between an operation mode and a display configuration manner, a display configuration manner corresponding to the current operation mode, where the display configuration manner includes the correspondence between each candidate area in the at least two candidate areas and a candidate-word display priority, so that the display displays, in each candidate area in the at least two candidate areas on the screen according to the correspondence, a candidate word that is of a candidate-word display priority corresponding to each candidate area and that is in the candidate-word subset.

With reference to the third possible implementation manner of the third aspect, in a fourth possible implementation manner, when determining the current operation mode of the terminal device, the processor is configured to:

determine the current operation mode according to current setting of the terminal device; or determine the current operation mode according to a triggered sliding operation of the terminal device and/or operation frequencies at which a left part and a right part of the terminal device are triggered.

With reference to the third or the fourth possible implementation manner of the third aspect, in a fifth possible implementation manner, the operation mode includes a left-hand operation mode or a right-hand operation mode.

With reference to any one of the third to the fifth possible implementation manners of the third aspect, in a sixth possible implementation manner, the processor is further configured to:

after adjusting the correspondence between each candidate area in the at least two candidate areas and a candidate-word display priority, use the adjusted correspondence between each candidate area in the at least two candidate areas and a candidate-word display priority as a new display configuration manner; and update a display configuration manner in the preset correspondence between an operation mode and a display configuration manner to the new display configuration manner.

In the embodiments of the present invention, a selection frequency at which each candidate area is selected in specified duration is counted, a delay value from a moment at which entering is completed in a keyboard area to a moment at which each candidate area is selected each time in the specified duration is calculated, an average delay value of each candidate area in the specified duration is calculated according to the calculated delay value, and after the specified duration, a correspondence between each candidate area and a candidate-word display priority is adjusted according to the obtained selection frequency and the obtained average delay value of each candidate area. In this way, according to an operation habit of a user for selecting each candidate area when using the terminal device, a candidate word displayed in the candidate area can be dynamically adjusted, so that an entering speed is optimized, a display area does not need to be reduced, a display manner is flexible, and user experience is improved.

DESCRIPTION OF EMBODIMENTS

Figure 1:
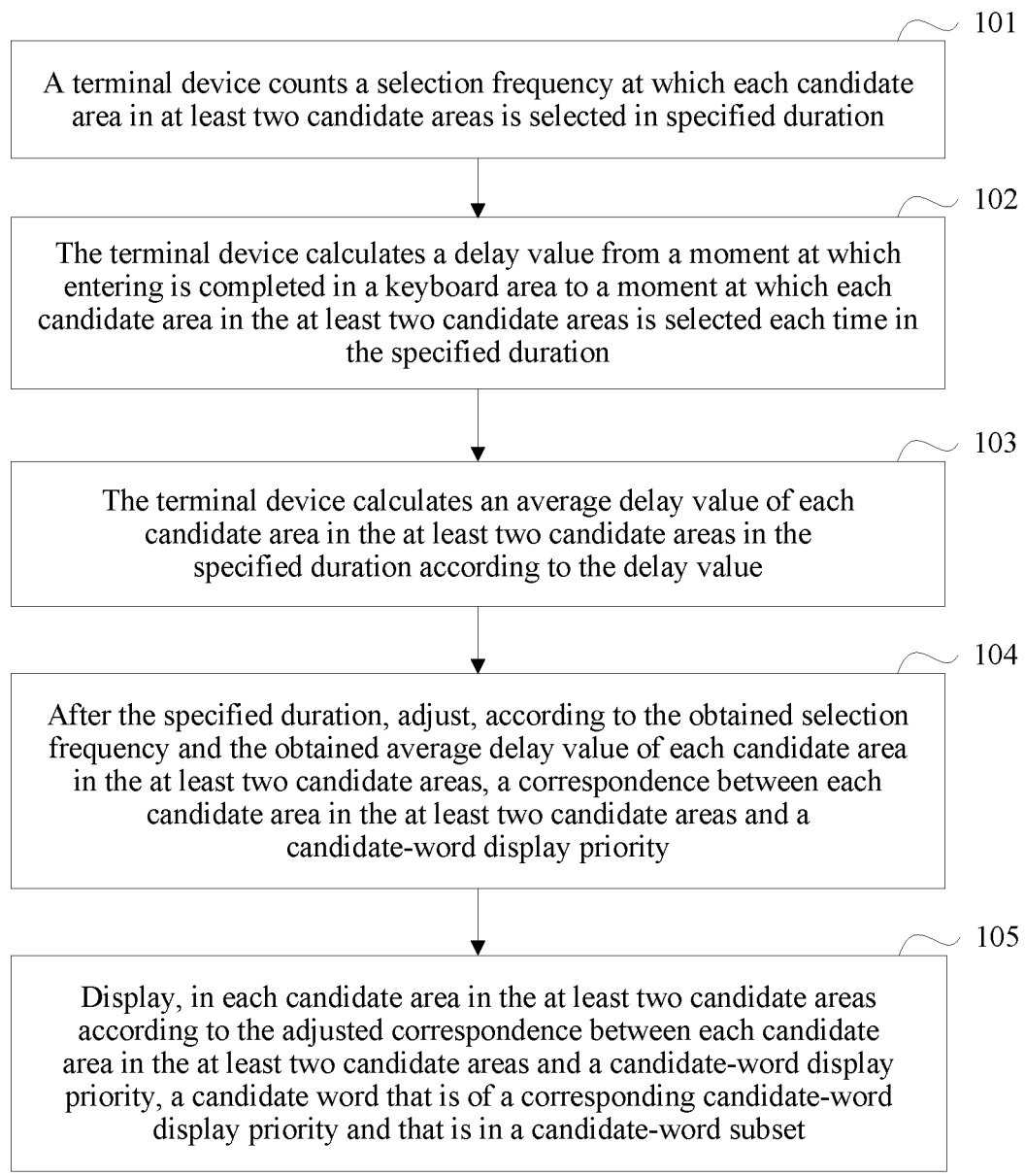
FIG. 1 is a flowchart of a method for displaying textual input of a terminal device according to an embodiment of the present invention.

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Embodiments of the present invention provide a method and an apparatus for displaying textual input of a terminal device, and a terminal device, so as to resolve prior-art problems that when a large-screen intelligent terminal device is operated with one hand, because a one-hand mode is used, a display area is reduced, operation difficulty is increased, a display manner is undiversified and inflexible, and user experience is reduced. The method and the apparatus are based on a same inventive concept, due to a similar problem-resolving principle of the method and the apparatus, mutual reference may be made to implementation of the apparatus and implementation of the method, and no repeated description is provided.

In the prior art, when a large-screen intelligent terminal device is used and an operation cannot be performed on a candidate area on a screen edge, a one-hand mode is used to reduce a display area in a specified proportion. Consequently, operation difficulty is increased, a display manner is undiversified and inflexible, and user experience is reduced. However, in a technical solution of the present invention, a selection frequency at which each candidate area is selected in specified duration is counted, a delay value from a moment at which entering is completed in a keyboard area to a moment at which each candidate area is selected each time in the specified duration is calculated, an average delay value of each candidate area in the specified duration is calculated according to the calculated delay value, and after the specified duration, a correspondence between each candidate area and a candidate-word display priority is adjusted according to the obtained selection frequency and the obtained average delay value of each candidate area. In this way, according to an operation habit of a user for selecting each candidate area when using the terminal device, a candidate word displayed in the candidate area can be dynamically adjusted, so that an entering speed is optimized, a display area does not need to be reduced, a display manner is flexible, and user experience is improved.

Embodiments of the present invention provide a method and an apparatus for displaying textual input of a terminal device that are applicable to a handheld intelligent terminal device such as a smart phone or a tablet computer on which entering is performed by using a keyboard area and a candidate word is selected from multiple candidate areas. The following describes an implementation manner of the present invention in detail with reference to the accompanying drawings.

As shown in FIG. 1, a method for displaying textual input of a terminal device is provided in an embodiment of the present invention. A screen of the terminal device includes a keyboard area and at least two candidate areas. Each candidate area in the at least two candidate areas is corresponding to a different candidate-word display priority, and each candidate area is used to display a candidate word that is of a corresponding candidate-word display priority and that is in a candidate-word subset of a character entered in the keyboard area. A procedure of the method includes the following steps.

Step 101: The terminal device counts a selection frequency at which each candidate area in the at least two candidate areas is selected in specified duration.

After a user enters a character in the keyboard area on the screen, the terminal device determines, according to the entered character, a to-be-displayed candidate-word subset corresponding to the entered character. Each candidate word in the candidate-word subset is corresponding to a different candidate-word display priority. The candidate word that is corresponding to the candidate-word display priority and that is in the candidate-word subset can be displayed only when each candidate area on the screen of the terminal device is corresponding to a different candidate-word display priority.

The specified duration may be set by the user according to an actual scenario, or may be set by the terminal device before factory delivery. A start moment of the specified duration may be a moment at which an application including a textual input function is enabled, a moment at which last adjustment is completed, a moment at which the terminal device is powered on, or a moment at which a candidate-word display priority to be displayed in each candidate area of the terminal device is initialized. The specified duration or the start moment of the specified duration is not limited in this embodiment of the present invention.

Before that the terminal device counts a selection frequency at which each candidate area in the at least two candidate areas on the screen is selected in specified duration, the method further includes:

determining, by the terminal device, a current operation mode;

determining, by the terminal device according to a preset correspondence between an operation mode and a display configuration manner, a display configuration manner corresponding to the current operation mode, where the display configuration manner includes a correspondence between each candidate area in the at least two candidate areas and a candidate-word display priority; and displaying, in each candidate area in the at least two candidate areas according to the correspondence, a candidate word that is of a candidate-word display priority corresponding to each candidate area and that is in a candidate-word subset.

Specifically, a storage module in the terminal device may store the correspondence between an operation mode and a display configuration manner. In this way, when the terminal device supports multiple operation modes, the terminal device may store multiple display configuration manners, so that a speed for adjusting to an optimal display configuration manner is improved.

In the prior art, a preferred-word high-frequency sorting method is usually used for displaying a candidate word in a candidate area, that is, after a character is entered in a keyboard area, in a to-be-displayed candidate-word subset, a candidate word with a highest selection frequency has a highest candidate-word display priority, a candidate word with a second highest selection frequency has a second highest candidate-word display priority, . . . . In addition, the candidate word of the highest candidate-word display priority is usually displayed in an upper leftmost candidate area, and a candidate word of a lowest candidate-word display priority is usually displayed in a lower rightmost candidate area. Obviously, the candidate area displays the candidate word of the candidate-word display priority according to a correspondence, included in a display configuration manner, between the candidate area and the candidate-word display priority.

The terminal device determines the current operation mode in the following two manners:

Manner 1: The terminal device determines the current operation mode according to current setting.

Manner 2: The terminal device determines the current operation mode according to a triggered sliding operation and/or operation frequencies at which a left part and a right part of the terminal device are triggered.

The operation mode includes a left-hand operation mode or a right-hand operation mode.

In Manner 1, the user determines the current operation mode by using a substantive key of the terminal device or according to setting selected by the user in the terminal device, that is, the user selects the left-hand operation mode or the right-hand operation mode by using the key of the terminal device, or selects the left-hand operation mode or the right-hand operation mode in a setting option of the terminal device.

In Manner 2, the terminal device may determine the current operation mode according to a sliding operation performed on the terminal device by the user, for example, when the terminal device is held in the right hand, usually, a right thumb performs the sliding operation, and when the right thumb performs the sliding operation, the right thumb usually slides from left to right. Therefore, the terminal device may determine the current operation mode according to a direction of the sliding operation. Optionally, the current operation mode may be determined according to the operation frequencies of the user on the left part and the right part of the terminal device. For example, when the right hand is used for operation, an operation frequency on the right part is usually greater than an operation frequency on the left part. Preferably, the current operation mode may be determined according to a combination of the sliding operation and the operation frequency.

Step 102: The terminal device calculates a delay value from a moment at which entering is completed in the keyboard area to a moment at which each candidate area in the at least two candidate areas is selected each time in the specified duration.

The user enters the character in the keyboard area, and after all characters are entered, selects a required candidate word from candidate words displayed in the candidate area, that is, the candidate area that displays the candidate word is selected. Because of different positions of the candidate area, delay values of the candidate area are different when the candidate area is selected.

In an actual operation, step 101 and step 102 are not performed in sequence. Step 101 may be performed first, and then step 102 and a subsequent step 103 are performed; or step 102 and a subsequent step 103 are performed first, and then step 101 is performed; or step 101, step 102, and a subsequent step 103 are performed at the same time. This is not limited in this embodiment of the present invention.

Step 103: The terminal device counts an average delay value of each candidate area in the at least two candidate areas in the specified duration according to the delay value.

For any candidate area, an average value of delay values of the candidate area that are obtained when the candidate area is selected is determined as the average delay value of the candidate area in the specified duration.

The average delay value obtained when each candidate area is selected may show an operation habit of the user in the candidate area.

Step 104: After the specified duration, adjust, according to the obtained selection frequency and the obtained average delay value of each candidate area in the at least two candidate areas, a correspondence between each candidate area in the at least two candidate areas and a candidate-word display priority.

Specifically, before the adjusting a correspondence between each candidate area in the at least two candidate areas and a candidate-word display priority, the method further includes:

determining that an obtained selection frequency of at least one candidate area is greater than or equal to a specified frequency threshold; or receiving an adjustment instruction.

The specified frequency threshold is set according to an actual scenario by the user or the terminal device, and may be 20, 30, 50, or the like. This is not limited in this embodiment of the present invention.

Specifically, the adjusting, according to the obtained selection frequency and the obtained average delay value of each candidate area in the at least two candidate areas, a correspondence between each candidate area in the at least two candidate areas and a candidate-word display priority includes:

sorting the at least two candidate areas in descending order of the obtained selection frequencies of the at least two candidate areas;

obtaining, according to the sorted at least two candidate areas, an order of candidate-word display priorities corresponding to the at least two candidate areas, and using the order as a candidate-word display priority sequence;

sorting the at least two candidate areas in ascending order of the obtained average delay values of the at least two candidate areas, to obtain a candidate-area sequence; and setting an $N^{th}$ display priority in the candidate-word display priority sequence for an $N^{th}$ candidate area in the candidate-area sequence, where N is a positive integer less than or equal to a quantity of candidate areas.

Specifically, each candidate area is corresponding to unique candidate-area information, such as an identifier of the candidate area, an address of the candidate area, or coordinates of the candidate area on the screen. Therefore, after the candidate areas are sorted, a generated candidate-area sequence is a candidate-area information sequence.

In this way, according to the operation habit of the user, a display priority corresponding to each candidate area is adjusted, to form a new display configuration manner. A candidate-word display priority corresponding to a candidate area with a high selection frequency is configured for a candidate area with a small average delay value, that is, a candidate word with a high selection probability is displayed in a candidate area that meets the operation habit of the user. Therefore, operation efficiency of the user is improved, an entering speed is optimized, a display manner is more flexible, and user experience is improved.

After the adjusting a correspondence between each candidate area in the at least two candidate areas and a candidate-word display priority, the method further includes:

using the adjusted correspondence between each candidate area in the at least two candidate areas and a candidate-word display priority as a new display configuration manner; and updating a display configuration manner in the preset correspondence between an operation mode and a display configuration manner to the new display configuration manner.

In this way, the adjusted display configuration manner may be directly used as an initial display configuration manner for next adjustment to initialize each candidate area. By means of constant adjustment, the display configuration manner may be increasingly closer to a use habit of the user, an entering speed is optimized to a maximum extent, and user experience is improved.

Step 105: Display, in each candidate area in the at least two candidate areas according to the adjusted correspondence between each candidate area in the at least two candidate areas and a candidate-word display priority, the candidate word that is of the corresponding candidate-word display priority and that is in the candidate-word subset.

It may be learned from the description in step 101 that each candidate word in the candidate-word subset is corresponding to a different candidate-word display priority. Each candidate area displays the candidate word that is of the corresponding candidate-word display priority and that is in the candidate-word subset of the character entered in the keyboard area. Therefore, the candidate word that is of the candidate-word display priority and that is in the candidate-word subset is displayed according to an adjusted candidate-word display priority corresponding to each candidate area.

According to the method for displaying textual input of a terminal device in this embodiment of the present invention, a selection frequency at which each candidate area on a screen is selected in specified duration is counted, a delay value from a moment at which entering is completed in a keyboard area to a moment at which each candidate area is selected each time in the specified duration is calculated, an average delay value of each candidate area in the specified duration is determined based on the delay value, and after the specified duration, a correspondence between each candidate area and a candidate-word display priority is adjusted according to the obtained selection frequency and the obtained average delay value of each candidate area. In this way, after a candidate-word display priority corresponding to each candidate area is adjusted, according to an operation habit of a user, an area with a short operation time is made corresponding to a candidate word with a relatively high selection probability, that is, a to-be-selected candidate word is dynamically adjusted to an area that is most convenient for user to move a finger. Therefore, operation habits of all users may be considered to a maximum extent, so that a candidate word displayed in the candidate area is increasingly closer to a use habit of the user, an entering speed is optimized, a display area does not need to be reduced, a display manner is more flexible, and user experience is improved.

Figure 2:
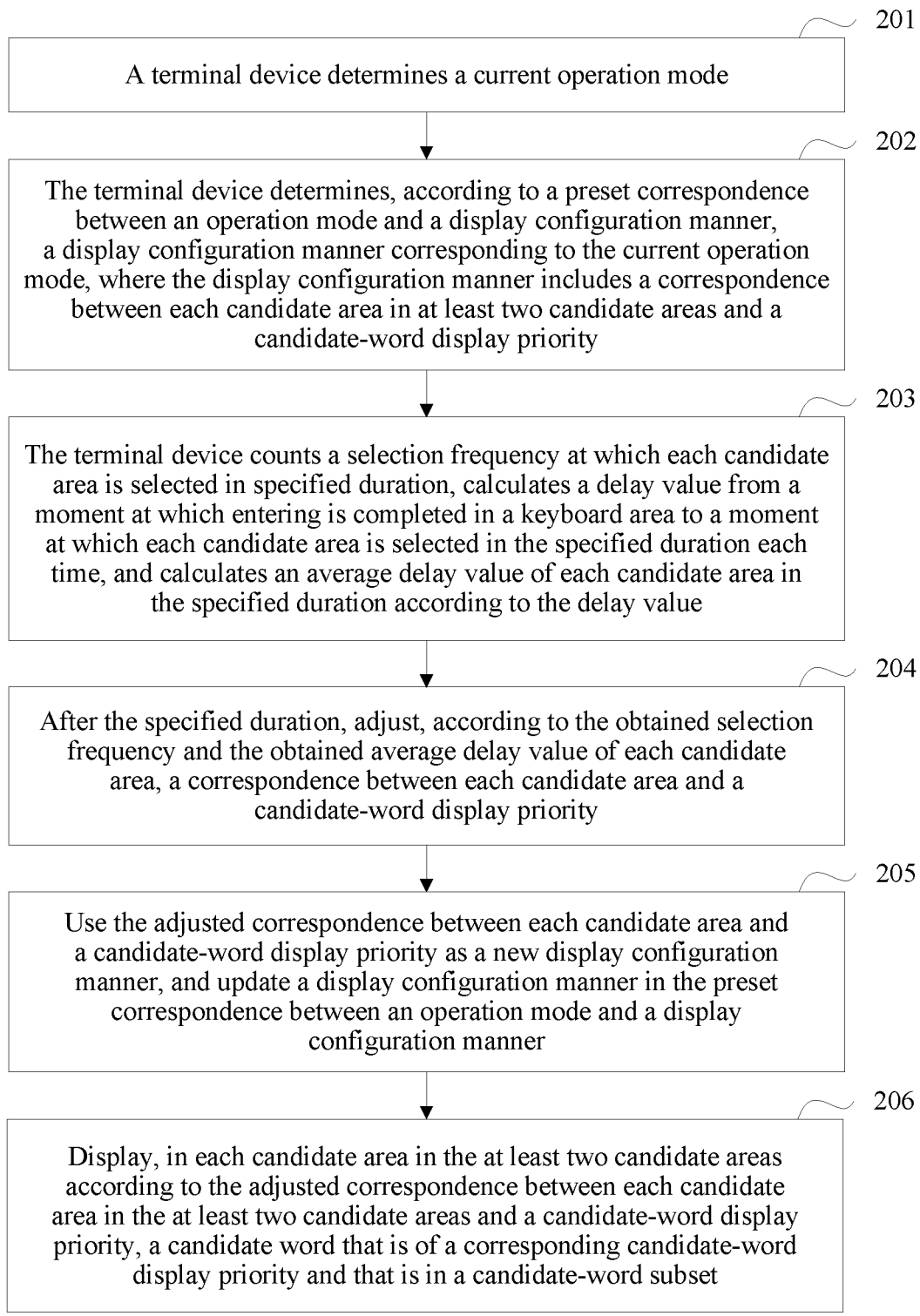
FIG. 2 is a specific flowchart of a method for displaying textual input of a terminal device according to an embodiment of the present invention.

As shown in FIG. 2, a method for displaying textual input of a terminal device is provided in an embodiment of the present invention, and the terminal device is a handheld intelligent terminal device such as a smart phone or a tablet computer on which entering is performed by using a keyboard area and a candidate word is selected from multiple candidate areas. A specific procedure of the method includes the following steps.

Step 201: The terminal device determines a current operation mode.

The operation mode is a left-hand operation mode or a right-hand operation mode.

Specifically, the terminal device determines the current operation mode in the following manners:

Manner 1: The terminal device determines the current operation mode according to current setting.

Manner 2: The terminal device determines the current operation mode according to a triggered sliding operation and/or operation frequencies at which a left part and a right part of the terminal device are triggered.

In Manner 1, a user determines the current operation mode by using a substantive key of the terminal device or according to setting selected by the user in the terminal device, that is, the user selects the left-hand operation mode or the right-hand operation mode by using the key of the terminal device, or selects the left-hand operation mode or the right-hand operation mode in a setting option of the terminal device.

In Manner 2, the terminal device may determine the current operation mode according to a sliding operation performed on the terminal device by the user, for example, when the terminal device is held in the right hand, usually, a right thumb performs the sliding operation, and when the right thumb performs the sliding operation, the right thumb usually slides from left to right. Therefore, the terminal device may determine the current operation mode according to a direction of the sliding operation. Optionally, the current operation mode may be determined according to the operation frequencies of the user on the left part and the right part of the terminal device. For example, when the right hand is used for operation, an operation frequency on the right part is usually greater than an operation frequency on the left part. Preferably, the current operation mode may be determined according to a combination of the sliding operation and the operation frequency.

In an example of this embodiment, the current operation mode is the right-hand operation mode.

Step 202: The terminal device determines, according to a preset correspondence between an operation mode and a display configuration manner, a display configuration manner corresponding to the current operation mode, where the display configuration manner includes a correspondence between each candidate area in the at least two candidate areas and a candidate-word display priority.

After the current operation mode is determined in step 201, each candidate area of the terminal device is initialized according to a pre-stored display configuration manner corresponding to the determined operation mode, that is, a corresponding display priority is set for each candidate area. For example, when an operation is performed by the right hand, different display priorities are set for the candidate areas from left to right and from top to bottom in descending order, that is, a highest display priority is set for an upper left candidate area, and a lowest display priority is set for a lower right candidate area. An option corresponding to the highest display priority is a candidate word with a highest occurrence frequency. For example, after an input method is enabled, when a Pinyin "de" is entered, a candidate word corresponding to a highest display priority is a Chinese character A, and a candidate word corresponding to a second highest display priority is a Chinese character B .... If the highest display priority is set for an upper left candidate area or a leftmost (in a row of candidate areas) candidate area, the Chinese character A is displayed in the upper left candidate area or the leftmost candidate area.

Figure 3:
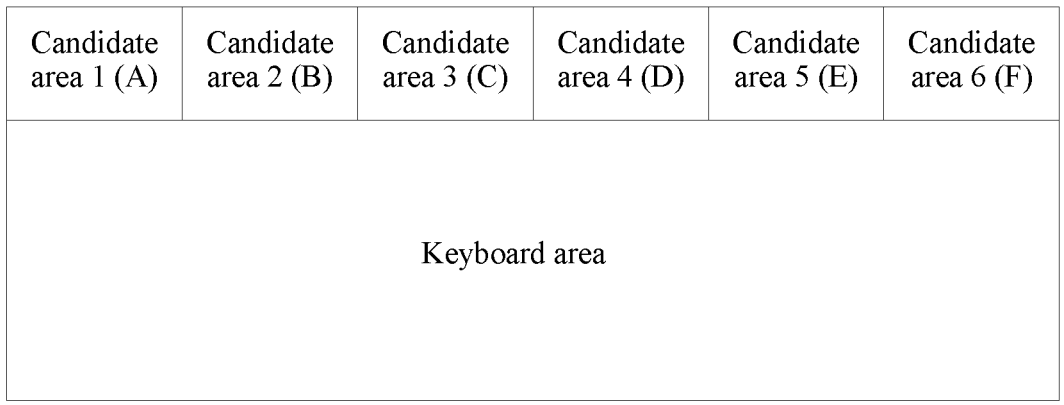
FIG. 3 is a schematic diagram of initialization of a candidate-word display priority of each candidate area according to an embodiment of the present invention.

When it is determined that the current operation mode is the right-hand operation mode, a corresponding candidate-word display priority is set for each candidate area according to the right-hand operation mode and a pre-stored display configuration manner corresponding to the right-hand operation mode. As shown in FIG. 3, corresponding candidate-word display priorities are separately set for candidate areas 1 to 6. The candidate-word display priorities are A, B, C, D, E, and F in descending order. A candidate-word display priority that is set for the candidate area 1 is A, a candidate-word display priority that is set for the candidate area 2 is B, ..., and a candidate-word display priority that is set for the candidate area 6 is F.

Step 203: The terminal device counts a selection frequency at which each candidate area is selected in specified duration; calculates a delay value from a moment at which entering is completed in the keyboard area to a moment at which each candidate area is selected each time in the specified duration; and calculates an average delay value of each candidate area in the specified duration according to the delay value.

The specified duration is set according to an actual scenario, and may be one hour, 30 minutes, or the like. This is not limited in this embodiment of the present invention.

Specifically, after the specified duration, an average delay value of any candidate area is calculated, and this includes:

using, as the average delay value of the candidate area, a calculated average value of delay values from the moment at which entering is completed in the keyboard area to moments at which the candidate area is selected in the specified duration.

In an example of this embodiment, the specified duration is two hours, and a start moment of the specified duration is a moment at which the terminal device is powered on. It is assumed that after two hours after the terminal device is powered on, selection frequencies at which the candidate areas 1 to 6 in FIG. 3 are selected in the specified duration are respectively 30, 15, 9, 7, 4, 2, and 1. Average delay values of the candidate areas 1 to 6 in the specified duration are respectively 0.5 second, 0.3 second, 0.1 second, 0.05 second, 0.01 second, and 0.03 second.

Step 204: After the specified duration, adjust a correspondence between each candidate area and a candidate-word display priority according to the obtained selection frequency and the obtained average delay value of each candidate area.

Before the adjusting a correspondence between each candidate area and a candidate-word display priority, the method further includes:

determining that an obtained selection frequency of at least one candidate area is greater than or equal to a specified frequency threshold; or receiving an adjustment instruction.

The specified frequency threshold is set according to an actual scenario by the user or the terminal device, and may be 20, 30, 50, or the like. This is not limited in this embodiment of the present invention. In an example of this embodiment, the specified frequency-domain threshold is 25. Because a selection frequency, obtained by means of counting in step 203, of the candidate area 1 is 30, the correspondence between each candidate area and a candidate-word display priority may be adjusted.

Figure 4:
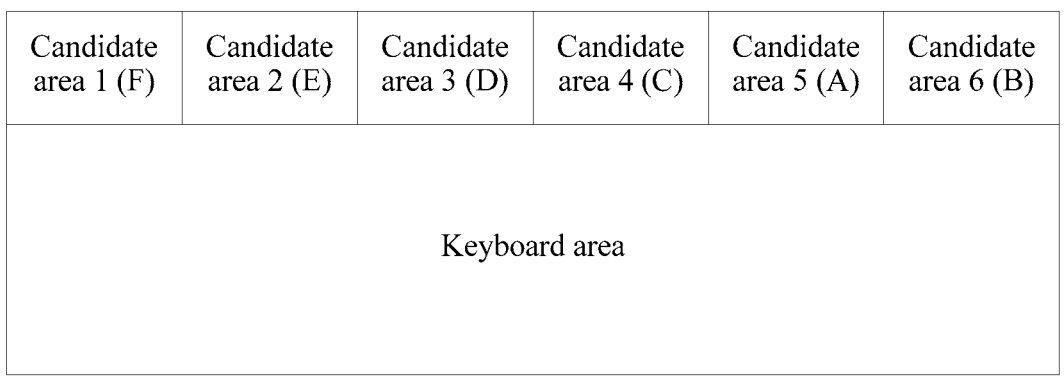
FIG. 4 is a schematic diagram of an adjusted candidate-word display priority of each candidate area according to an embodiment of the present invention.

Specifically, the adjusting a correspondence between each candidate area and a candidate-word display priority includes:

sorting the at least two candidate areas in descending order of the obtained selection frequencies of the at least two candidate areas, to obtain an order: the candidate area 1, the candidate area 2, the candidate area 3, the candidate area 4, the candidate area 5, the candidate area 6;

obtaining, according to the sorted at least two candidate areas, an order of candidate-word display priorities corresponding to the at least two candidate areas: A, B, C, D, E, F, and using the order as a candidate-word display priority sequence;

sorting the at least two candidate areas in ascending order of the obtained average delay values of the at least two candidate areas, to obtain a candidate-area sequence: the candidate area 5, the candidate area 6, the candidate area 4, the candidate area 3, the candidate area 2, the candidate area 1; and setting an $N^{th}$ display priority in the candidate-word display priority sequence for an $N^{th}$ candidate area in the candidate-area sequence, where N is a positive integer less than or equal to a quantity of candidate areas, and in this embodiment, N is 6. After the adjustment, the candidate-word display priorities corresponding to the candidate areas 1 to 6 are shown in FIG. 4, that is, the candidate-word display priority that is set for the candidate area 1 is F, the candidate-word display priority that is set for the candidate area 2 is E, the candidate-word display priority that is set for the candidate area 3 is D, the candidate-word display priority that is set for the candidate area 4 is C, the candidate-word display priority that is set for the candidate area 5 is A, and the candidate-word display priority that is set for the candidate area 6 is B.

Step 205: Use an adjusted correspondence between each candidate area and a candidate-word display priority as a new display configuration manner, and update a display configuration manner in the preset correspondence between an operation mode and a display configuration manner.

In this way, the adjusted display configuration manner may be directly used as an initial display configuration manner for next adjustment to initialize each candidate area. By means of constant adjustment, the display configuration manner may be increasingly closer to a use habit of the user, an entering speed is optimized to a maximum extent, and user experience is improved.

Step 206: Display, in each candidate area in the at least two candidate areas according to the adjusted correspondence between each candidate area in the at least two candidate areas and a candidate-word display priority, the candidate word that is of the corresponding candidate-word display priority and that is in the candidate-word subset.

In this way, according to a selection frequency and an average delay value of each candidate area, a correspondence between each candidate area and a candidate-word display priority is adjusted. According to an operation habit of a user, an area with a short operation time is made corresponding to a candidate word with a relatively high selection probability, that is, a to-be-selected candidate word is dynamically adjusted to an area that is most convenient for user to move a finger. Therefore, operation habits of all users may be considered to a maximum extent, so that a candidate word displayed in the candidate area is increasingly closer to a use habit of the user, an entering speed is optimized, a display area does not need to be reduced, a display manner is more flexible, and user experience is improved.

Figure 5:
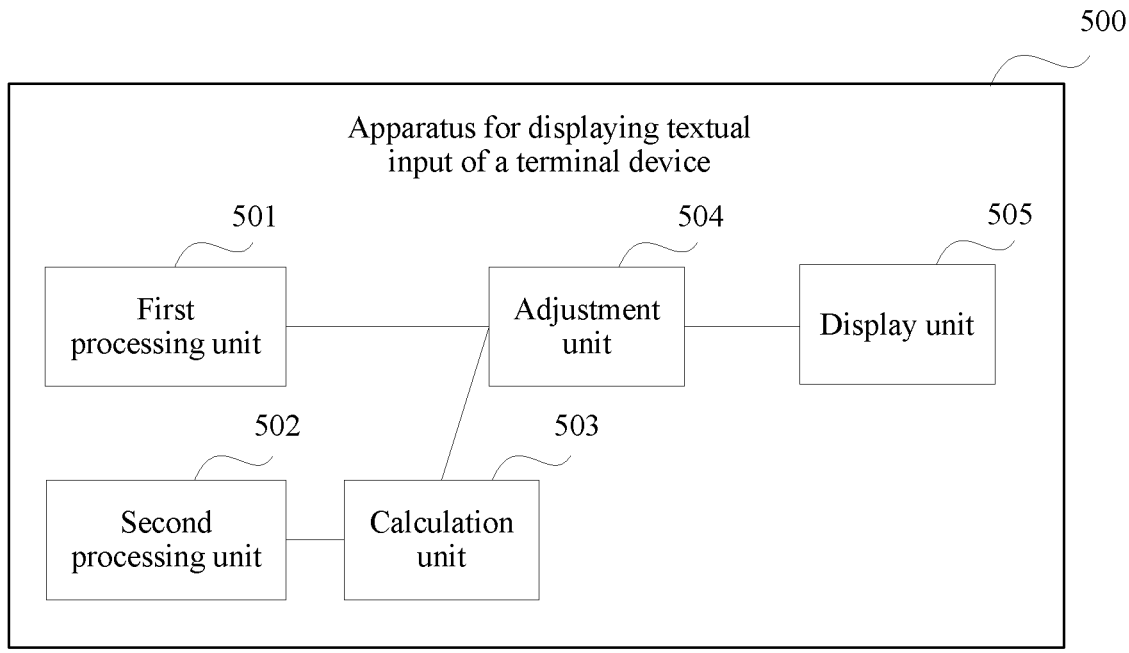
FIG. 5 is a schematic structural diagram of an apparatus for displaying textual input of a terminal device according to an embodiment of the present invention.

Based on the foregoing embodiments, as shown in FIG. 5, an apparatus for displaying textual input of a terminal device is further provided in an embodiment of the present invention, and the apparatus is applicable to a handheld terminal device on which entering is performed by using a keyboard area and a candidate word is selected from multiple candidate areas. A screen of the terminal device includes a keyboard area and at least two candidate areas. Each candidate area in the at least two candidate areas is corresponding to a different candidate-word display priority, and each candidate area is used to display a candidate word that is of a corresponding candidate-word display priority and that is in a candidate-word subset of a character entered in the keyboard area. The apparatus 500 includes a first processing unit 501, a second processing unit 502, a calculation unit 503, an adjustment unit 504, and a display unit 505.

The first processing unit 501 is configured to count a selection frequency at which each candidate area in the at least two candidate areas is selected in specified duration.

The second processing unit 502 is configured to calculate a delay value from a moment at which entering is completed in the keyboard area to a moment at which each candidate area in the at least two candidate areas is selected each time in the specified duration.

The calculation unit 503 is configured to calculate an average delay value of each candidate area in the at least two candidate areas in the specified duration according to the delay value.

The adjustment unit 504 is configured to: after the specified duration, adjust, according to the obtained selection frequency and the obtained average delay value of each candidate area in the at least two candidate areas, a correspondence between each candidate area in the at least two candidate areas and a candidate-word display priority.

The display unit 505 is configured to display, in each candidate area in the at least two candidate areas according to the adjusted correspondence between each candidate area in the at least two candidate areas and a candidate-word display priority, the candidate word that is of the corresponding candidate-word display priority and that is in the candidate-word subset.

Optionally, the adjustment unit 504 is further configured to:
before adjusting the correspondence between each candidate area in the at least two candidate areas and a candidate-word display priority, determine that an obtained selection frequency of at least one candidate area is greater than or equal to a specified frequency threshold, or receive an adjustment instruction.

Optionally, the adjustment unit 504 is specifically configured to:
sort the at least two candidate areas in descending order of the obtained selection frequencies of the at least two candidate areas;
obtain, according to the sorted at least two candidate areas, an order of candidate-word display priorities corresponding to the at least two candidate areas, and use the order as a candidate-word display priority sequence;
sort the at least two candidate areas in ascending order of the obtained average delay values of the at least two candidate areas, to obtain a candidate-area sequence; and
set an $N^{th}$ display priority in the candidate-word display priority sequence for an $N^{th}$ candidate area in the candidate-area sequence, where N is a positive integer less than or equal to a quantity of candidate areas.

Optionally, the apparatus 500 further includes:
a configuration unit 506, configured to: before the first processing unit 501 counts the selection frequency at which each candidate area in the at least two candidate areas is selected in the specified duration, determine a current operation mode of the terminal device;
determine, according to a preset correspondence between an operation mode and a display configuration manner, a display configuration manner corresponding to the current operation mode, where the display configuration manner includes the correspondence between each candidate area in the at least two candidate areas and a candidate-word display priority; and
display, in each candidate area in the at least two candidate areas according to the correspondence, a candidate word that is of a candidate-word display priority corresponding to each candidate area and that is in the candidate-word subset.

Optionally, when determining the current operation mode of the terminal device, the configuration unit 506 is specifically configured to:
determine the current operation mode according to current setting of the terminal device; or
determine the current operation mode according to a triggered sliding operation of the terminal device and/or operation frequencies at which a left part and a right part of the terminal device are triggered.

Optionally, the operation mode includes a left-hand operation mode or a right-hand operation mode.

Optionally, the adjustment unit 504 is further configured to:
after adjusting the correspondence between each candidate area in the at least two candidate areas and a candidate-word display priority, use the adjusted correspondence between each candidate area in the at least two candidate areas and a candidate-word display priority as a new display configuration manner; and
update a display configuration manner in the preset correspondence between an operation mode and a display configuration manner to the new display configuration manner.

Figure 6:
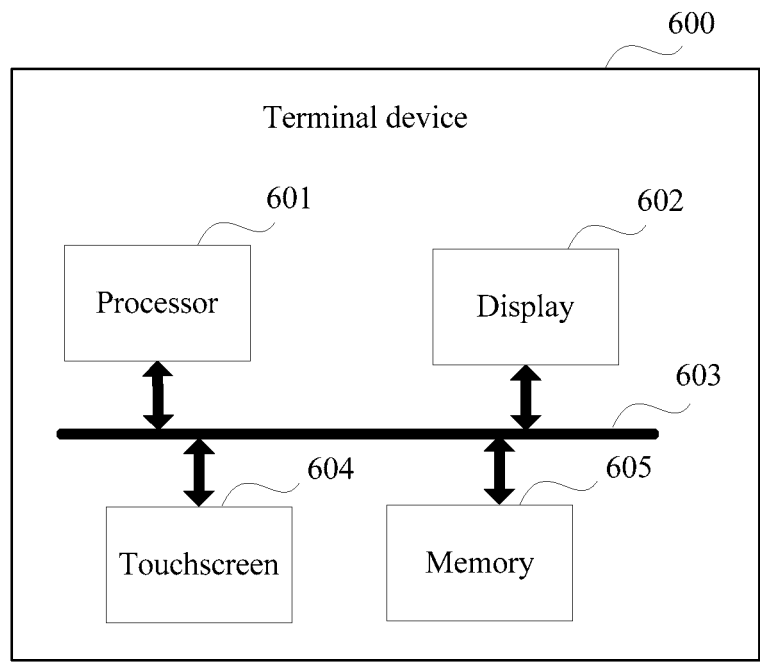
FIG. 6 is a schematic structural diagram of a terminal device according to an embodiment of the present invention.

Based on the foregoing embodiments, a terminal device is further provided in an embodiment of the present invention. As shown in FIG. 6, a terminal device 600 includes a processor 601, a display 602, and a touchscreen 604.

The processor 601, the display 602, and the touchscreen 604 are connected to each other by using a bus 603. The display 602 is used to output a character, a picture, and/or a video. The display 602 may include a display panel such as a display panel configured in a form of an LCD (Liquid Crystal Display, liquid crystal display), an OLED (Organic Light-Emitting Diode, organic light-emitting diode), a field emission display (field emission display, FED for short), or the like. The display 602 may include a reflective display such as an electrophoretic (electrophoretic) display or a display that uses a technology of interferometric modulation of light (Interferometric Modulation of Light). The display 602 may include a single display or multiple displays of different sizes. The touchscreen 604 may be configured to detect input of a user. Touching or pressing a corresponding area of the touchscreen 604 may trigger a response of corresponding content of the display 603, for example, when a text is entered, a corresponding text may be selected by taping a touchscreen area corresponding to content displayed in the display. The bus 603 may be a peripheral component interconnect (peripheral component interconnect, PCI for short) bus, an extended industry standard architecture (extended industry standard architecture, EISA for short) bus, or the like. The bus may be classified into an address bus, a data bus, a control bus, and the like. For ease of illustration, only one bold line is used in FIG. 6 to represent the bus, which, however, does not mean there is only one bus or only one type of bus. The processor 601 is a control center of the terminal device and is connected to each part of the entire terminal device by using various interfaces and lines. The processor 601 implements various functions of the terminal device and/or processes data by running or executing a software program and/or a module that are/is stored in a storage unit and by invoking data stored in the storage unit. The processor 601 may include an integrated circuit (Integrated Circuit, IC for short), for example, may include a single packaged IC, or may be formed by connecting multiple packaged ICs that have a same function or different functions. For example, the processor 601 may include only a central processing unit (Central Processing Unit, CPU for short), or may be a combination of a GPU, a digital signal processor (Digital Signal Processor, DSP for short), and a control chip (for example, a baseband chip) in a communication unit. In an implementation manner of the present invention, the CPU may be a single computing core, or may include multiple computing cores. It may be understood that the screen of the terminal device may include the touchscreen and the display, or may be one of the touchscreen or the display.

The processor 601 is configured to: count a selection frequency at which each candidate area in at least two candidate areas is selected in specified duration;

calculate a delay value from a moment at which entering is completed in a keyboard area to a moment at which each candidate area in the at least two candidate areas is selected each time in the specified duration;

calculate an average delay value of each candidate area in the at least two candidate areas in the specified duration according to the delay value; and after the specified duration, adjust, according to the obtained selection frequency and the obtained average delay value of each candidate area in the at least two candidate areas, a correspondence between each candidate area in the at least two candidate areas and a candidate-word display priority.

The display 602 is configured to display, in each candidate area in the at least two candidate areas on the display according to the correspondence that is between each candidate area in the at least two candidate areas and a candidate-word display priority and that is adjusted by the processor 601, a candidate word that is of a corresponding candidate-word display priority and that is in a candidate-word subset.

Optionally, the processor 601 is further configured to:

before adjusting the correspondence between each candidate area in the at least two candidate areas and a candidate-word display priority, determine that an obtained selection frequency of at least one candidate area is greater than or equal to a specified frequency threshold, or receive an adjustment instruction.

Optionally, the processor 601 is configured to:

sort the at least two candidate areas in descending order of the obtained selection frequencies of the at least two candidate areas;

obtain, according to the sorted at least two candidate areas, an order of candidate-word display priorities corresponding to the at least two candidate areas, and use the order as a candidate-word display priority sequence;

sort the at least two candidate areas in ascending order of the obtained average delay values of the at least two candidate areas, to obtain a candidate-area sequence; and set an $N^{th}$ display priority in the candidate-word display priority sequence for an $N^{th}$ candidate area in the candidate-area sequence, where N is a positive integer less than or equal to a quantity of candidate areas.

Optionally, the processor 601 is further configured to:

before counting the selection frequency at which each candidate area in the at least two candidate areas is selected in the specified duration, determine a current operation mode of the terminal device 600;

determine, according to a preset correspondence between an operation mode and a display configuration manner, a display configuration manner corresponding to the current operation mode, where the display configuration manner includes the correspondence between each candidate area in the at least two candidate areas and a candidate-word display priority, so that the display 602 displays, in each candidate area in the at least two candidate areas on the screen according to the correspondence, a candidate word that is of a candidate-word display priority corresponding to each candidate area and that is in the candidate-word subset.

Optionally, when determining the current operation mode of the terminal device, the processor 601 is configured to:

determine the current operation mode according to current setting of the terminal device 600; or determine the current operation mode according to a triggered sliding operation of the terminal device 600 and/or operation frequencies at which a left part and a right part of the terminal device 600 are triggered.

Optionally, the operation mode includes a left-hand operation mode or a right-hand operation mode.

Optionally, the processor 601 is further configured to:

after adjusting the correspondence between each candidate area in the at least two candidate areas and a candidate-word display priority, use the adjusted correspondence between each candidate area in the at least two candidate areas and a candidate-word display priority as a new display configuration manner; and update a display configuration manner in the preset correspondence between an operation mode and a display configuration manner to the new display configuration manner.

The terminal device 600 further includes the memory 605 that is configured to store a program and the like. Specifically, the program may include program code, and the program code includes a computer operation instruction. The memory 605 may include a random access memory (random access memory, RAM), or may further include a nonvolatile memory (non-volatile memory), for example, at least one hard disk. The processor 601 executes an application program stored in the memory 605 to implement the foregoing method for displaying textual input of a terminal device.

In conclusion, embodiments of the present invention provide a method and an apparatus for displaying textual input of a terminal device, and a terminal device. In the method, a selection frequency at which each candidate area is selected in specified duration is counted, a delay value from a moment at which entering is completed in a keyboard area to a moment at which each candidate area is selected each time in the specified duration is calculated, an average delay value of each candidate area in the specified duration is calculated according to the calculated delay value, and after the specified duration, a correspondence between each candidate area and a candidate-word display priority is adjusted according to the obtained selection frequency and the obtained average delay value of each candidate area. In this way, according to an operation habit of a user for selecting each candidate area when using the terminal device, a candidate word displayed in the candidate area can be dynamically adjusted, so that an entering speed is optimized, a display area does not need to be reduced, a display manner is flexible, and user experience is improved.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A method for displaying textual input of a terminal device having a screen comprising a keyboard area and at least two candidate areas, each candidate area in the at least two candidate areas is corresponding to a different candidate-word display priority, each candidate area is used for displaying a candidate word that is of a corresponding candidate-word display priority and that is in a candidate-word subset of a character entered in the keyboard area, the method comprising:

determining, by the terminal device, a current operation mode;

determining, by the terminal device, according to a preset correspondence between an operation mode and a display configuration manner, a display configuration manner corresponding to the current operation mode, wherein the display configuration manner includes a correspondence between each candidate area in the at least two candidate areas and a candidate-word display priority;

counting, by the terminal device, a selection frequency at which each candidate area in the at least two candidate areas is selected in a specified duration;

calculating, by the terminal device, a delay value from a moment at which entering is completed in the keyboard area to a moment at which each candidate area in the at least two candidate areas is selected each time in the specified duration;

calculating, by the terminal device, an average delay value of each candidate area in the at least two candidate areas in the specified duration according to the delay value;

after the specified duration, adjusting, according to the selection frequency and the average delay value of each candidate area in the at least two candidate areas, a correspondence between each candidate area in the at least two candidate areas and a candidate-word display priority; and displaying, in each candidate area in the at least two candidate areas according to the adjusted correspondence between each candidate area in the at least two candidate areas and a candidate-word display priority, the candidate word that is of the corresponding candidate-word display priority and that is in the candidate-word subset.

2. The method according to claim 1, wherein after determining a display configuration manner corresponding to the current operation mode, the method further comprises:

displaying, in each candidate area in the at least two candidate areas according to the correspondence, a candidate word that is of a candidate-word display priority corresponding to each candidate area and that is in the candidate-word subset.

3. The method according to claim 1, wherein determining, by the terminal device, a current operation mode comprises:
determining, by the terminal device, the current operation mode according to current setting; or
determining, by the terminal device, the current operation mode according to at least one of a triggered sliding operation or operation frequencies at which a left part and a right part of the terminal device are triggered.

4. The method according to claim 1, wherein the operation mode comprises a left-hand operation mode or a right-hand operation mode.

5. The method according to claim 1, before adjusting a correspondence between each candidate area in the at least two candidate areas and a candidate-word display priority, the method further comprises:
determining that an obtained selection frequency of at least one candidate area is greater than or equal to a specified frequency threshold; or
receiving an adjustment instruction.

6. The method according to claim 1, wherein adjusting, according to the selection frequency and the average delay value of each candidate area in the at least two candidate areas, a correspondence between each candidate area in the at least two candidate areas and a candidate-word display priority comprises:
sorting the at least two candidate areas in descending order of the selection frequencies of the at least two candidate areas;
obtaining, according to the sorted at least two candidate areas, an order of candidate-word display priorities corresponding to the at least two candidate areas, and using the order as a candidate-word display priority sequence;
sorting the at least two candidate areas in ascending order of the average delay values of the at least two candidate areas, to obtain a candidate-area sequence; and
setting an $N^{th}$ display priority in the candidate-word display priority sequence for an $N^{th}$ candidate area in the candidate-area sequence, wherein N is a positive integer less than or equal to a quantity of candidate areas.

7. The method according to claim 6, wherein after adjusting a correspondence between each candidate area in the at least two candidate areas and a candidate-word display priority, the method further comprises:
using the adjusted correspondence between each candidate area in the at least two candidate areas and a candidate-word display priority as a new display configuration manner; and
updating a display configuration manner in the preset correspondence between an operation mode and a display configuration manner to the new display configuration manner.

8. A terminal device, comprising:
a touchscreen configured to detect output of a user;
a display comprising a keyboard area and at least two candidate areas, each candidate area in the at least two candidate areas is corresponding to a different candidate-word display priority, each candidate area is used to display a candidate word that is of a corresponding candidate-word display priority and that is in a candidate-word subset of a character entered in the keyboard area; and
a processor configured to:
determine a current operation mode;
determine according to a preset correspondence between an operation mode and a display configuration manner, a display configuration manner corresponding to the current operation mode, wherein the display configuration manner includes a correspondence between each candidate area in the at least two candidate areas and a candidate-word display priority;
count a selection frequency at which each candidate area in the at least two candidate areas is selected in a specified duration;
calculate a delay value from a moment at which entering is completed in the keyboard area to a moment at which each candidate area in the at least two candidate areas is selected each time in the specified duration;
calculate an average delay value of each candidate area in the at least two candidate areas in the specified duration according to the delay value; and
after the specified duration, adjust, according to the selection frequency and the average delay value of each candidate area in the at least two candidate areas, a correspondence between each candidate area in the at least two candidate areas and a candidate-word display priority, wherein:
the display is configured to display, in each candidate area in the at least two candidate areas on the display according to the correspondence that is between each candidate area in the at least two candidate areas and a candidate-word display priority and that is adjusted by the processor, the candidate word that is of the corresponding candidate-word display priority and that is in the candidate-word subset.

9. The terminal device according to claim 8, wherein the processor is further configured to:
after determining a display configuration manner corresponding to the current operation mode, display in each candidate area in the at least two candidate areas according to the correspondence, a candidate word that is of a candidate-word display priority corresponding to each candidate area and that is in the candidate-word subset.

10. The terminal device according to claim 8, wherein the processor is further configured to:
determine a current operation mode according to current setting; or
determine a current operation mode according to at least one of a triggered sliding operation operation frequencies at which a left part and a right part of the terminal device are triggered.

11. The terminal device according to claim 8, wherein the operation mode comprises a left-hand operation mode or a right-hand operation mode.

12. The terminal device according to claim 8, wherein the processor is further configured to:
before adjusting the correspondence between each candidate area in the at least two candidate areas and a candidate-word display priority, determine that an obtained selection frequency of at least one candidate area is greater than or equal to a specified frequency threshold, or receive an adjustment instruction.

13. The terminal device according to claim 8, wherein the processor is configured to:
- sort the at least two candidate areas in descending order of the selection frequencies of the at least two candidate areas;
- obtain, according to the sorted at least two candidate areas, an order of candidate-word display priorities corresponding to the at least two candidate areas, and use the order as a candidate-word display priority sequence;
- sort the at least two candidate areas in ascending order of the average delay values of the at least two candidate areas, to obtain a candidate-area sequence; and
- set an $N^{th}$ display priority in the candidate-word display priority sequence for an $N^{th}$ candidate area in the candidate-area sequence, wherein N is a positive integer less than or equal to a quantity of candidate areas.

14. The terminal device according to claim 8, wherein the processor is further configured to:
- after adjusting the correspondence between each candidate area in the at least two candidate areas and a candidate-word display priority, use the adjusted correspondence between each candidate area in the at least two candidate areas and a candidate-word display priority as a new display configuration manner; and
- update a display configuration manner in the preset correspondence between an operation mode and a display configuration manner to the new display configuration manner.

15. A non-transitory computer-readable recording medium on which a program is recorded, wherein the program, when executed by a terminal device, causes the terminal device to:
- determine a current operation mode;
- determine according to a preset correspondence between an operation mode and a display configuration manner, a display configuration manner corresponding to the current operation mode, wherein the display configuration manner includes a correspondence between each candidate area in at least two candidate areas and a candidate-word display priority;
- count a selection frequency at which each candidate area in the at least two candidate areas is selected in a specified duration;
- calculate a delay value from a moment at which entering is completed in a keyboard area to a moment at which each candidate area in the at least two candidate areas is selected each time in the specified duration;
- calculate an average delay value of each candidate area in the at least two candidate areas in the specified duration according to the delay value;
- after the specified duration, adjust, according to the selection frequency and the average delay value of each candidate area in the at least two candidate areas, a correspondence between each candidate area in the at least two candidate areas and a candidate-word display priority; and
- display, in each candidate area in the at least two candidate areas according to the adjusted correspondence between each candidate area in the at least two candidate areas and a candidate-word display priority, a candidate word that is of a corresponding candidate-word display priority and that is in a candidate-word subset.

16. The non-transitory computer-readable recording medium according to claim 15, wherein after determining a display configuration manner corresponding to the current operation mode, the program, when executed by the terminal device, causes the terminal device to:
- display, in each candidate area in the at least two candidate areas according to the correspondence, a candidate word that is of a candidate-word display priority corresponding to each candidate area and that is in the candidate-word subset.

17. The non-transitory computer-readable recording medium according to claim 15, wherein to determine a current operation mode, the program, when executed by the terminal device, causes the terminal device to:
- determine the current operation mode according to current setting; or
- determine the current operation mode according to at least one of a triggered sliding operation or operation frequencies at which a left part and a right part of the terminal device are triggered.

18. The non-transitory computer-readable recording medium according to claim 15, wherein the operation mode comprises a left-hand operation mode or a right-hand operation mode.

* * * * *

UNITED STATES PATENT AND TRADEMARK OFFICE
CERTIFICATE OF CORRECTION

PATENT NO. : 10,846,476 B2
APPLICATION NO. : 15/567911
DATED : November 24, 2020
INVENTOR(S) : Yujie Chen Page 1 of 1

It is certified that error appears in the above-identified patent and that said Letters Patent is hereby corrected as shown below:

In the Claims

In Column 22, Line 54, in Claim 10, delete "operation operation" and insert -- operation or operation --, therefor.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*